United States Patent
Tsuneishi et al.

[11] Patent Number: 5,922,098
[45] Date of Patent: Jul. 13, 1999

[54] CLEANING A GLASS PREFORM WITH A HIGH TEMPERATURE INERT GAS DURING THE DRAWING OF AN OPTICAL FIBER

[75] Inventors: Katsuyuki Tsuneishi; Toshiaki Kakii; Katsuzo Mukai; Satoshi Tanaka, all of Kanagawa, Japan

[73] Assignee: Sumitomo Electric Industries, Ltd., Osaka, Japan

[21] Appl. No.: 08/619,208

[22] Filed: Mar. 21, 1996

[30] Foreign Application Priority Data

Mar. 24, 1995 [JP] Japan ................................. 7-064640

[51] Int. Cl.⁶ ...................... C03B 37/012; C03B 37/027
[52] U.S. Cl. ................ 65/384; 65/435; 65/391; 65/424; 65/385
[58] Field of Search ............... 65/384, 435, 391, 65/424, 385, 404

[56] References Cited

U.S. PATENT DOCUMENTS

| | | |
|---|---|---|
| 4,174,842 | 11/1979 | Partus ................................ 65/500 |
| 4,925,473 | 5/1990 | Jeskey ............................... 65/385 |
| 4,978,378 | 12/1990 | Ito et al. ........................... 65/3.12 |
| 5,211,730 | 5/1993 | Kanamori et al. ................. 65/3.12 |
| 5,338,327 | 8/1994 | Ohga et al. ....................... 65/414 |
| 5,637,130 | 6/1997 | Nagayama ....................... 65/435 |

FOREIGN PATENT DOCUMENTS

| | | |
|---|---|---|
| 0 216 338 | 4/1987 | European Pat. Off. . |
| 629590 | 12/1994 | European Pat. Off. ........... 65/385 |
| 60-155541 | 8/1985 | Japan ................................ 65/435 |
| 61-1384 | 1/1986 | Japan . |
| 4-198035 | 7/1992 | Japan . |
| 5-279067 | 10/1993 | Japan ................................ 65/435 |
| 1680649 | 9/1991 | U.S.S.R. ............................ 65/384 |
| 1522176 | 8/1978 | United Kingdom . |

*Primary Examiner*—John Hoffmann
*Attorney, Agent, or Firm*—Pillsbury Madison & Sutro LLP

[57] ABSTRACT

In a drawing method and drawing apparatus according to the present invention, a forward end portion of an optical fiber glass preform is heated and melted while the glass preform is fed into a drawing furnace 3 so that an optical fiber is drawn, and the optical fiber glass preform is heated in a position just above the drawing furnace to make the surface of the glass preform clean.

11 Claims, 3 Drawing Sheets

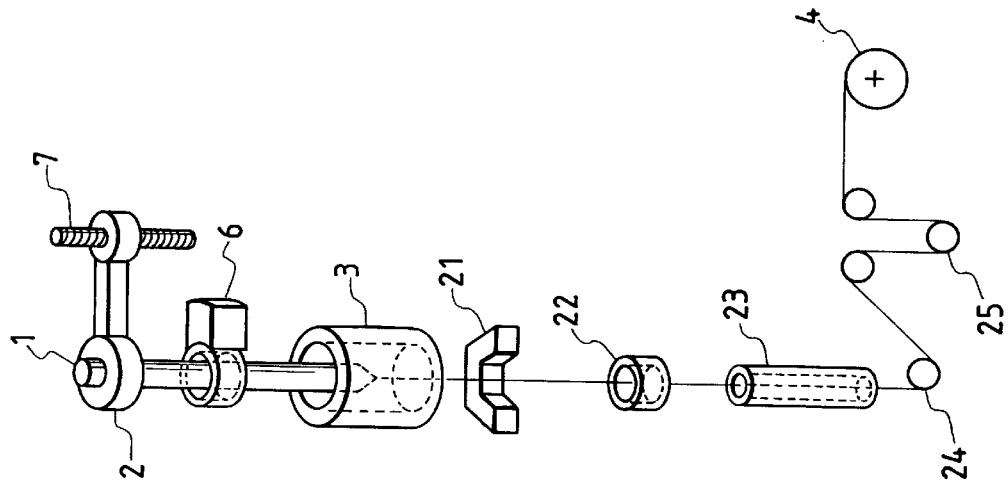
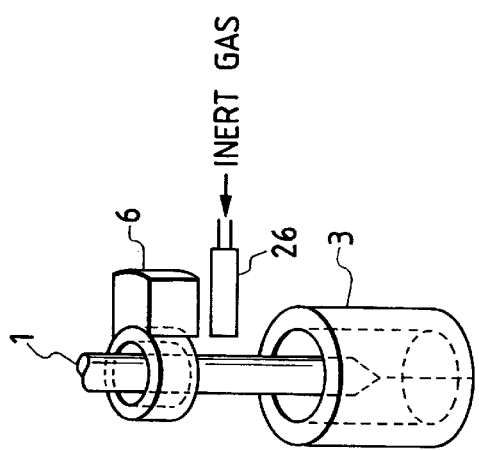
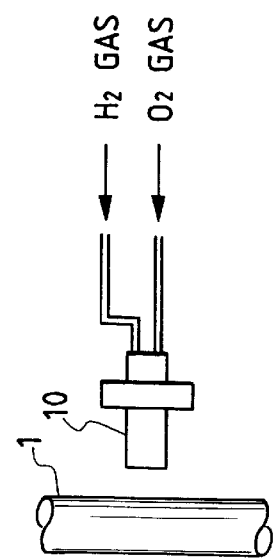

CLEANING A GLASS PREFORM WITH A HIGH TEMPERATURE INERT GAS DURING THE DRAWING OF AN OPTICAL FIBER

BACKGROUND OF THE INVENTION

1. Field of the Invention

The present invention relates to an optical fiber drawing method and apparatus, in which reduction in optical fiber strength due to surface injuries or the like of an optical fiber glass preform can be suppressed.

2. Description of the Related Art

FIG. 6 is a side view showing the configuration of a conventional drawing apparatus. In the apparatus, an optical fiber glass preform 1 is grasped by a feeder 2, and the forward end portion of the optical fiber glass preform 1 is heated and melted while the optical fiber glass preform 1 is fed into a drawing furnace 3, and then drawn by a capstan 24 so that an optical fiber 5 is drawn. In this case, the feeder is supported by an appropriate supporting member (not shown) through a screw 7. Generally, after passing through the drawing furnace 3, the optical fiber 5 is passed through a diameter monitor 21 for monitoring the diameter thereof. Thereafter, the optical fiber 5 is passed through a coating die 22 to be coated with an appropriate resin. Then, the optical fiber 5 is wound by a take-up bobbin 4 through a curing furnace 23, a capstan 24 and a proof tester 25. The curing furnace 23 sets the resin applied to the optical fiber 5 at the coating die 22. Incidentally, the proof tester 25 gives a predetermined tension to the optical fiber 5. If a portion of the optical fiber does not has a sufficient strength, the portion is broken when the portion passes through the proof tester 25.

Thus obtained quartz glass fiber having a diameter of 125 $\mu$m generally has breaking strength of about 7 kg. In an actual case, however, micro injuries or foreign matters are generated or deposited respectively in or on the surface of the glass in the process of production, so that portions of low strength exist in the longitudinal direction. Further, the foreign matters deposited on the surface cause not only reduction in strength but also deviations in outer diameter.

Accordingly, in order to remove injuries or foreign matters on the surface of glass, measures are taken so that an optical fiber glass preform is subjected to etching with chemicals or to flame abrasion treatment. Further, deposition of foreign matters is prevented by making the cleanliness of production atmosphere high.

Even if the surface of an optical fiber glass preform is subjected to etching with chemicals or to flame abrasion treatment after production of the glass preform, new injuries or foreign matters may be generated or deposited to cause reduction of strength in handling till the optical fiber glass preform is mounted on the drawing apparatus. Therefore, it is not always possible to obtain a satisfactory result.

SUMMARY OF THE INVENTION

It is an object of the present invention to provide a drawing method and a drawing apparatus capable of suppressing the strength reduction caused in the optical fiber drawing process. According to the present invention, an optical fiber drawing method comprises the steps of: heating and melting a forward end portion of an optical fiber glass preform while feeding the optical fiber glass preform into a drawing furnace to perform optical fiber drawing; and heating the optical fiber glass preform in a position just above the drawing furnace to make a surface of the optical fiber glass preform clean.

According to the present invention, an optical fiber drawing apparatus comprises: a feeder for grasping and feeding an optical fiber glass preform; a drawing furnace for heating and melting a forward end portion of the fed optical fiber glass preform to form an optical fiber; a take-up mechanism for taking up the optical fiber at a predetermined speed; and a heater for heating a surface of the optical fiber glass preform, and the heating means being provided between the feeding means and the drawing furnace.

In the drawing method and apparatus according to the present invention, the optical fiber glass preform is heated in a position just above the drawing furnace to make the surface of the base material clean and subsequently the drawing is carried out. Accordingly, the injuries or foreign matters in or on the surface of the base material can be substantially completely removed so that the reduction in strength as well as the deviations in outer diameter can be suppressed in the optical fiber.

BRIEF DESCRIPTION OF THE DRAWINGS

In the accompanying drawings;

FIG. 1A is a side view showing the configuration of the drawing apparatus according to an embodiment of the present invention;

FIG. 1B is a partial side view showing the configuration of the drawing apparatus according to another embodiment of the present invention;

FIG. 2 is a side view showing the configuration of the heating device according to an embodiment of the present invention;

PREFERRED EMBODIMENT OF THE INVENTION

Figure 3:
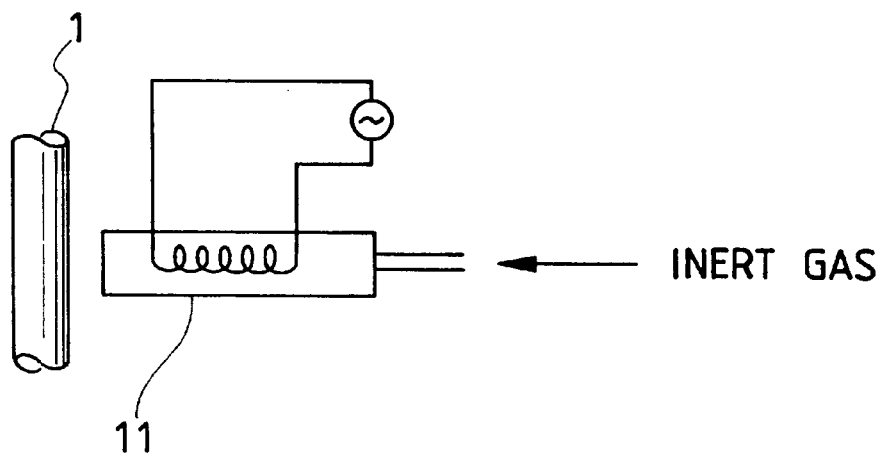
FIG. 3 is a side view showing another configuration of the heating device according to an embodiment of the present invention.

Referring to the accompanying drawings, an embodiment of the present invention will be described below. In the drawings, the same elements are correspondingly referenced and repeated descriptions will be omitted.

FIG. 1A is a side view showing the configuration of the drawing apparatus according to the embodiment of the present invention. In the drawing, the forward end portion of an optical fiber glass preform 1 grasped by a feeder 2 is heated and melted by a drawing furnace 3, and then drawn by a capstan 24 so that an optical fiber 5 is drawn. In this case, the feeder is supported by an appropriate supporting member (not shown) through a screw 7. Generally, after passing through the drawing furnace 3, the optical fiber 5 is passed through a diameter monitor 21 for monitoring the diameter thereof. Thereafter, the optical fiber 5 is passed through a coating die 22 to be coated with an appropriate coating. Then, the optical fiber 5 is wound by the take-up bobbin 4 through a curing furnace 23, a capstan 24 and a proof tester 25. The curing furnace 23 sets the resin applied to the optical fiber 5 at the coating die 22. Incidentally, the proof tester 25 gives a predetermined tension to the optical fiber 5. If a portion of the optical fiber does not has a sufficient strength, the portion is broken when the portion passes through the proof tester 25. In this embodiment, the optical fiber glass preform 1 is heated by a heating device 6 disposed in a position between the feeder and the drawing furnace 3, preferably just above the drawing furnace 3, to make the surface of the glass preform clean. That is, after the injuries or foreign matters in or on the surface of the optical fiber glass preform 1 are removed, the optical fiber glass preform 1 is drawn immediately.

The optical fiber glass preform 1 grasped by the feeder 2 is fed into the drawing furnace 3 at a predetermined speed v so that the forward end portion of the optical fiber glass preform 1 is heated and melted, and the melted forward end portion of the glass preform 1 is drawn by a capstan 24 at a predetermined speed V higher than the speed v to thereby obtain an optical fiber 5 having a desired diameter. Here, the following relation is established between the cross sectional area $S_1$ of the optical fiber glass preform 1 and the cross sectional area $S_X$ of the optical fiber 5: $S_1 v = S_X V$.

In order to remove the injuries or foreign matters in or on the surface of the optical fiber glass preform 1 of quartz glass fibers, an oxyhydrogen flame or an inert gas heated up to equal to or more than 1200° C. is blown onto the surface of glass preform 1. The temperature of the inert gas is preferably in the range of 1200° C. to 1900° C., because if the temperature is higher than 1900° C., the optical fiber glass preform 1 may be melted. Even if the temperature is less than 1200° C., merely foreign matters on the surface of the optical fiber glass preform 1 may be removed. FIGS. 2 and 3 show examples of the cases where the surface of the optical fiber glass preform 1 is heated by an oxyhydrogen burner 10 and by an inert gas heater 11 respectively.

Figure 4:
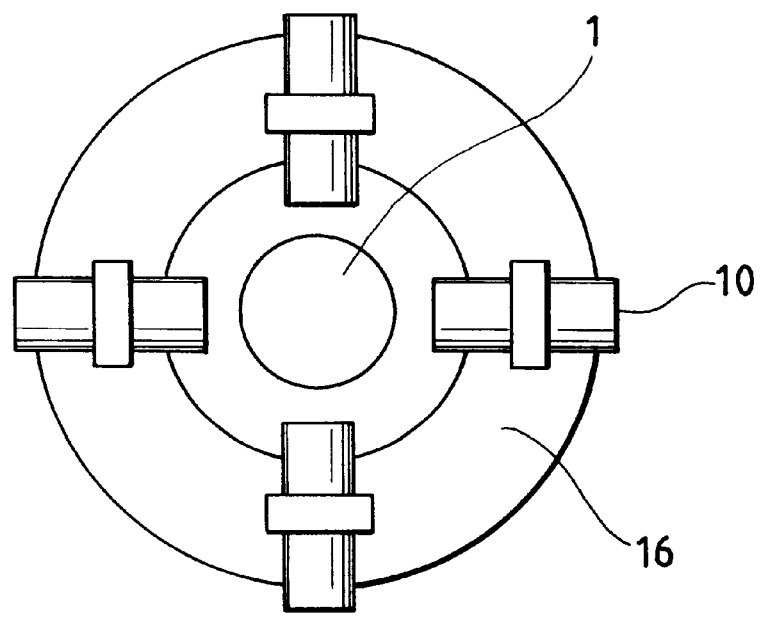
FIG. 4 is a plan view showing another configuration of the heating device according to an embodiment of the present invention.

Further, FIG. 4 shows a case where four oxyhydrogen burners 10 formed in such a manner as described above are used, and FIG. 5 shows a case where such an oxyhydrogen burner 10 as described above is attached on a rotary stage 17 which is rotated reciprocately. In each of these cases, the optical fiber glass preform 1 can be heated evenly in the axial direction thereof and those example are preferable for glass preforms having a thick diameter. In this case, the inert gas heater 11 may be used in place of the oxyhydrogen burner 10.

Incidentally, in the present invention, it is preferable that the heating device 6 is provided just above the drawing furnace. However, the heating device 6 is positioned where the flame and/or the inert gas of the heating device 6 are not achieved. Accordingly, the heating device 6 and the drawing furnace have to be provided separately. If the flame and/or inert gas are blown into the drawing furnace, the melted optical fiber in the drawing furnace is influenced by them.

In another embodiment showing in FIG. 1B, the surface of the optical fiber glass preform 1 is heated by a heating device 6 equal to or more than 1200° C. in a position between the feeder 1 and the drawing furnace 3, preferably just above the drawing furnace 3, and then a gas blowing device 26 blows a heated inert gas onto the surface of the optical fiber glass preform 1. The blowing device 26 is provided between the heating device 6 and the drawing furnace 3 to make the surface of the glass preforms clean. Here, for example, as the heating device 6 is used so as to heat the surface of the glass preform to 1500° C. and then blow an inert gas of $N_2$ heated to 1000° C. onto the surface of the glass preform. The inert gas is used for the purpose of removal of burned matters or the like on the surface of the glass preform and the temperature for heating the inert gas is not limitative.

Figure 5:
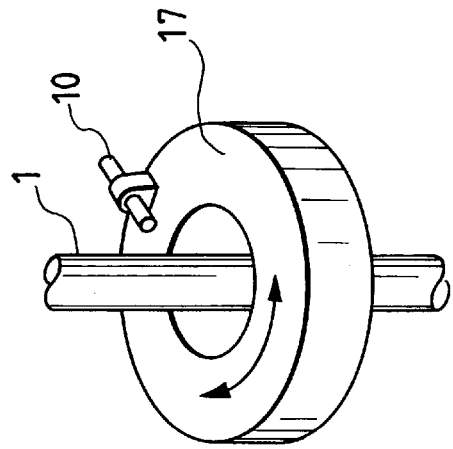
FIG. 5 is a side view showing another configuration of the heating device according to an embodiment of the present invention.

Next, an example of experiment in which drawing was effected by the drawing apparatus of FIG. 1A to which the heating device 6 of FIG. 5 was applied will be described. In this example, an optical fiber glass preform having an outer diameter of 40 mm was drawn at a speed of 400 m/min to thereby obtain an optical fiber having an outer diameter of 125 μm. As the heating device 6, one oxyhydrogen burner 10 was fixed on the rotary stage 17 and rotated at a speed of 5 revolutions per minute. The heating was effected while a hydrogen gas and a oxygen gas were fed at rates of 100 liters per minute and 35 liters per minute respectively to the oxyhydrogen burner 10 so that an optical fiber of 1,023 Km in total was drawn. No deviation in outer diameter of the optical fiber was generated, and no disconnection was caused while the drawing was effected in a condition that a load of 1.0 kg was applied.

Further, the drawing was effected by using such a heating device as shown in FIG. 3. An optical fiber of 1,067 km in total was drawn while a nitrogen gas heated up to 1400° C. was blown to the surface of an optical fiber glass preform at a rate of 100 liters per minute. No deviation in outer diameter of the optical fiber was generated, and no disconnection was caused which the drawing was effected while a load of 1.0 kg was applied.

Figure 6:
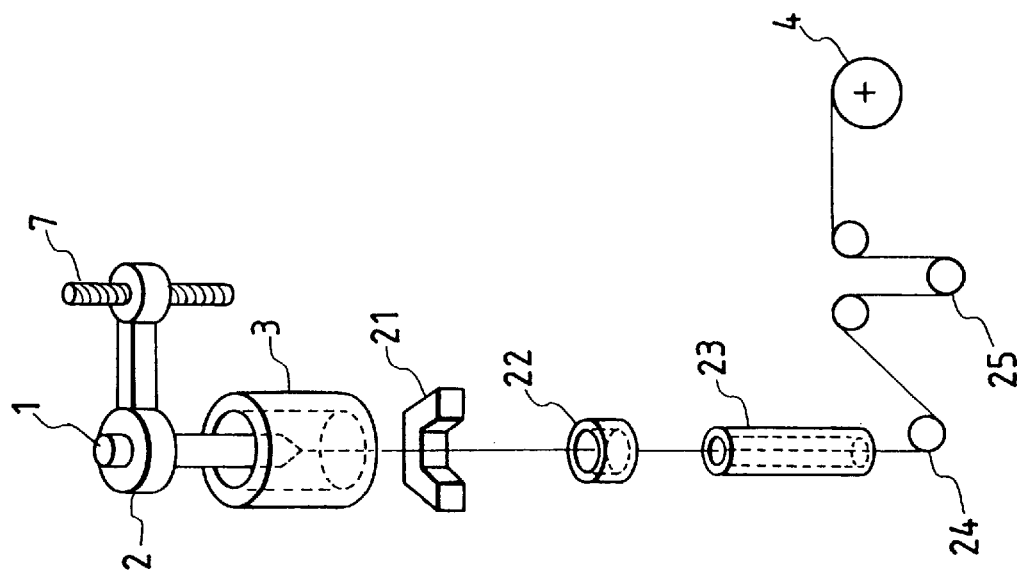
FIG. 6 is a side view showing the configuration of a conventional drawing apparatus.

Further, by using the conventional apparatus shown in FIG. 6, an optical fiber of 989 km in total was drawn. Two times of variations in outer diameter of the optical fiber were generated, and three times of disconnections were caused when drawing was effected while a load of 1.0 kg was applied.

As described above, in the drawing method and drawing apparatus according to the present invention, an optical fiber glass preform is heated in a position just above an drawing furnace to make the surface of the glass preform clean, and subsequently, this glass preform is drawn. Accordingly, injuries or foreign materials in or on the surface of the glass preform can be removed substantially completely, and reduction in strength and deviations in outer diameter of an optical fiber can be suppressed.

What is claimed is:

1. An optical fiber drawing method comprising the steps of:

taking an optical fiber glass preform having a substantially cylindrical surface and a predetermined drawing temperature;

heating the surface of said optical fiber glass preform to a temperature of at least 1200° C.;

blowing the surface of said optical fiber glass preform with a high temperature inert gas, said high temperature inert gas being between about 1000° C. and 1900° C., to remove foreign matter from said surface to produce a cleaned surface; and in a separate step subsequent to said heating step and said blowing step, feeding said optical fiber glass preform into a drawing furnace to heat a forward end portion of said optical fiber glass preform to the predetermined drawing temperature and perform optical fiber drawing, said feeding of said optical fiber glass preform into said drawing furnace being accomplished without any physical contact with the cleaned surface of said optical fiber glass preform after said blowing step and before said optical fiber glass preform enters said drawing furnace.

2. An optical fiber drawing method according to claim 1, wherein the surface of said optical fiber glass preform is heated and blown by an oxyhydrogen frame.

3. An optical fiber drawing method according to claim 2, wherein the surface of said optical fiber glass preform is heated from a plurality of directions at the same time.

4. An optical fiber drawing method according to claim 2, wherein the surface of said optical fiber glass preform is heated while said surface is rotated and moved.

5. An optical fiber drawing method according to claim 1, wherein the said steps of heating the surface of said optical fiber preform to a temperature of at least 1200° C. and blowing the surface of said optical fiber glass preform are performed simultaneously using said high temperature inert gas.

6. An optical fiber drawing method according to claim 5, wherein said step of heating the surface of said optical fiber glass preform to a temperature of at least 1200° C. and blowing the surface of said optical fiber glass preform is accomplished by introducing said high temperature inert gas simultaneously from a plurality of radial directions.

7. An optical fiber drawing method according to claim 5, wherein the surface of said optical fiber glass preform is heated while said surface is rotated and moved. simultaneously using said high temperature inert gas.

8. An optical fiber drawing method according to claim 5, wherein said step of heating the surface of said optical fiber glass preform to a temperature of at least 1200° C. and blowing the surface of said optical fiber glass preform is the last step before said optical fiber glass preform is fed into said drawing furnace.

9. An optical fiber drawing method according to claim 1, wherein said step of heating the surface of said optical fiber preform to a temperature of at least 1200° C. is accomplished by simultaneously heating the optical glass preform from a plurality of radial directions.

10. An optical fiber drawing method according to claim 1, wherein the surface of said optical fiber glass preform is heated while said surface is rotated and moved.

11. An optical fiber drawing method according to claim 1, wherein said step of blowing the surface of said optical fiber glass preform with said high temperature inert gas is performed subsequent to said step of heating the surface of said optical fiber glass preform to a temperature of at least 1200° C. and further wherein said step of blowing the surface is the last step before said optical fiber glass preform is fed into said drawing furnace, said high temperature inert gas being prevented from entering said drawing furnace.

* * * * *